United States Patent
Fujita et al.

(10) Patent No.: US 8,321,561 B2
(45) Date of Patent: Nov. 27, 2012

(54) INFORMATION SHARING METHOD BETWEEN NEIGHBORING NODES, NODE AND INFORMATION SHARING PROGRAM

(75) Inventors: Norihito Fujita, Tokyo (JP); Masahiro Jibiki, Tokyo (JP); Shigeru Asai, Tokyo (JP)

(73) Assignee: NEC Corporation, Tokyo (JP)

( * ) Notice: Subject to any disclaimer, the term of this patent is extended or adjusted under 35 U.S.C. 154(b) by 290 days.

(21) Appl. No.: 12/664,291

(22) PCT Filed: Jun. 25, 2008

(86) PCT No.: PCT/JP2008/061522
§ 371 (c)(1),
(2), (4) Date: Dec. 11, 2009

(87) PCT Pub. No.: WO2009/001845
PCT Pub. Date: Dec. 31, 2008

(65) Prior Publication Data
US 2010/0191848 A1    Jul. 29, 2010

(30) Foreign Application Priority Data

Jun. 28, 2007 (JP) .................................. 2007-170690

(51) Int. Cl.
*G06F 15/173* (2006.01)
*G06F 15/16* (2006.01)

(52) U.S. Cl. ........................................ 709/224; 709/229
(58) Field of Classification Search ................. 709/223, 709/224, 225, 229
See application file for complete search history.

(56) References Cited

U.S. PATENT DOCUMENTS

| | | | | |
|---|---|---|---|---|
| 7,031,288 | B2* | 4/2006 | Ogier | 370/338 |
| 7,693,181 | B2* | 4/2010 | Ramachandran et al. | 370/469 |
| 2003/0161268 | A1* | 8/2003 | Larsson et al. | 370/229 |
| 2003/0169684 | A1* | 9/2003 | Yamanaka et al. | 370/216 |
| 2007/0266134 | A1* | 11/2007 | Shyy et al. | 709/223 |

FOREIGN PATENT DOCUMENTS

JP  2002354038 A  12/2002
JP  2006157716 A   6/2006

OTHER PUBLICATIONS

International Search Report for PCT/JP2008/061522 mailed Aug. 12, 2008.

* cited by examiner

*Primary Examiner* — Brian J Gillis

(57) ABSTRACT

A load caused by an information sharing message in an upper layer is reduced. A node, which shares information by exchanging a message between neighboring nodes in a lower layer and an upper layer of a network, includes a unit for determining whether or not to transmit a message for information sharing in the upper layer according to the contents of a state change in the neighboring nodes detected when a state change in the neighboring nodes in the lower layer is detected.

18 Claims, 10 Drawing Sheets

101 ROUTING TABLE

| DESTINATION IP ADDRESS | NEXT HOP IP ADDRESS | METRICS |
|---|---|---|
| 10.0.0.1 | 10.0.0.1 | 1 |
| 10.0.0.3 | 10.0.0.1 | 2 |
| 10.0.0.6 | 10.0.0.6 | 1 |
| 10.0.0.10 | 10.0.0.19 | 3 |
| 10.0.0.12 | 10.0.0.6 | 4 |
| 10.0.0.19 | 10.0.0.19 | 1 |

102 TRANSMISSION DETERMINATION TABLE

| INFORMATION TYPE | UPDATE FREQUENCY | NEW NEIGHBORING NODE RATIO THRESHOLD VALUE |
|---|---|---|
| NODE ID | 0 TIMES/SEC | 0.8 |
| USER ID | 0 TIMES/SEC | 0.8 |
| POSITIONAL INFORMATION | 0.2 TIMES/SEC | 0.4 |
| RETAINED CONTENTS LIST | 0.05 TIMES/SEC | 0.2 |
| :::: | :::: | :::: |

103 TIMER TABLE

| INFORMATION TYPE | UPDATE FREQUENCY | t1(sec) | t2(sec) |
|---|---|---|---|
| NODE ID | 0 TIMES/SEC | 60 | 360 |
| USER ID | 0 TIMES/SEC | 60 | 360 |
| POSITIONAL INFORMATION | 0.2 TIMES/SEC | 5 | 30 |
| RETAINED CONTENTS LIST | 0.05 TIMES/SEC | 20 | 120 |
| ... | ... | ... | ... |

INFORMATION SHARING METHOD BETWEEN NEIGHBORING NODES, NODE AND INFORMATION SHARING PROGRAM

INCORPORATION BY REFERENCE

The present application is the National Phase of PCT/JP2008/061522, filed Jun. 25, 2008, which claims the benefit of the priority of Japanese Patent Application No. 2007-170690, filed on Jun. 28, 2007, the entire disclosure of which is incorporated herein.

TECHNICAL FIELD

The present invention relates to an information sharing method for sharing information with neighboring nodes in both a lower layer and an upper layer of a network, and more particularly, to an information sharing method, a node and an information sharing program for efficiently sharing information between neighboring nodes in an upper layer when a routing protocol is used in a lower layer.

BACKGROUND ART

This type of information sharing method between neighboring nodes is used in order to increase follow-up capabilities with respect to a topology change and an information change in an upper layer while reducing the amount of messages for information sharing in the upper layer by sharing information with neighboring nodes in the upper layer, triggered by the detection event of changes in the neighboring state between nodes and in topology in a lower layer of a network.

For example, a case will be described in which a routing protocol is used to exchange topology information in the lower layer, and at the same time, information such as node information and positional information is exchanged in the upper layer.

When messages are exchanged independently in each layer, a message exchange is generally performed in the lower layer at short update intervals, therefore, follow-up with respect to changes in the neighboring state and topology is fast. In contrast to this, in the upper layer, since a message exchange is performed at relatively long update intervals, follow-up with respect to changes in the neighboring state and topology is relatively slow.

Therefore, instead of performing message exchanges independently in each later, a message exchange for information sharing in the upper layer is performed, triggered by the detection of a topology change in the lower layer, allowing follow-up with respect to the topology change in the upper layer to be accelerated.

For example, Patent Document 1 describes a network management system in which a line in an upper layer affected by failure and performance degradation is controlled, triggered by the detection of failure or performance degradation of a line in a lower layer. Specifically, Patent Document 1 describes such examples as performing control to bypass a corresponding link in the upper layer.

In addition, Patent Document 2 describes a network node device detecting a change in topology map information, which contains information on the topology in a layer 2, and updating a neighbor registration table in a layer 3 to regenerate a routing table in the layer 3, triggered by the detection of the update of the neighbor registration table.

Patent Document 1: Japanese Patent Laid-Open No. 2002-354038

Patent Document 2: Japanese Patent Laid-Open No. 2006-157716

The information sharing method between neighboring nodes described in the related art has the following problems.

A first problem is that, following a topology change in the lower layer, even information that is unnecessary to update in the upper layer is exchanged, leading to an increase in the amount of message exchanges in the upper layer.

Every time a topology change is detected in the lower layer, a message exchange for information sharing is performed in the upper layer, therefore, for example, even if a sufficient number/ratio of neighboring nodes having information on the node in question are present because a message for information sharing has been transmitted until the last time, a message exchange for information sharing is performed each time, leading to heavy loads.

A second problem is that the load of a message exchange for information sharing in the upper layer becomes considerably high if the topology is changed frequently in the lower layer.

Every time a topology change is detected in the lower layer, a message exchange for information sharing is performed in the upper layer, therefore, if the topology is changed frequently, even for the information for which frequent update is not necessary in the upper layer because the update frequency is not high, a message exchange for information sharing is performed each time, leading to heavy loads.

It is an exemplary object of the present invention to provide an information sharing method between neighboring nodes, a node and an information sharing program capable of reducing a load caused by a message for information sharing in an upper layer.

SUMMARY

According to a first exemplary aspect of the invention, an information sharing method between neighboring nodes, comprising the steps of:

exchanging a message for information sharing between the neighboring nodes in a lower layer and an upper layer of a network; wherein when a state change in the neighboring nodes in the lower layer is detected, each node determines whether or not to transmit the message for information sharing in the upper layer according to the contents of the detected state change in the neighboring nodes.

According to a second exemplary aspect of the invention, a node, which shares information by exchanging a message between neighboring nodes in a lower layer and an upper layer of a network, includes a unit which, when a state change in the neighboring nodes in the lower layer is detected, determines whether or not to transmit the message for information sharing in the upper layer according to the contents of the detected state change in the neighboring nodes.

According to a third exemplary aspect of the invention, an information sharing program which causes a node, which is a computer for sharing information by exchanging a message between neighboring nodes in a lower layer and an upper layer of a network, to perform when a state change in the neighboring nodes in the lower layer is detected, processing of determining whether or not to transmit the message for information sharing in the upper layer according to the contents of the detected state change in the neighboring nodes.

According to the present invention, a load of a message for information sharing in an upper layer protocol can be reduced.

This is because when a state change in the neighboring nodes in a lower layer is detected, whether or not to transmit a message for information sharing in an upper layer is determined according to the contents of the detected state change in the neighboring nodes.

EXEMPLARY EMBODIMENT

First Exemplary Embodiment

Next, a first exemplary embodiment of the present invention will be described in detail with reference to the drawings.

Figure 1:
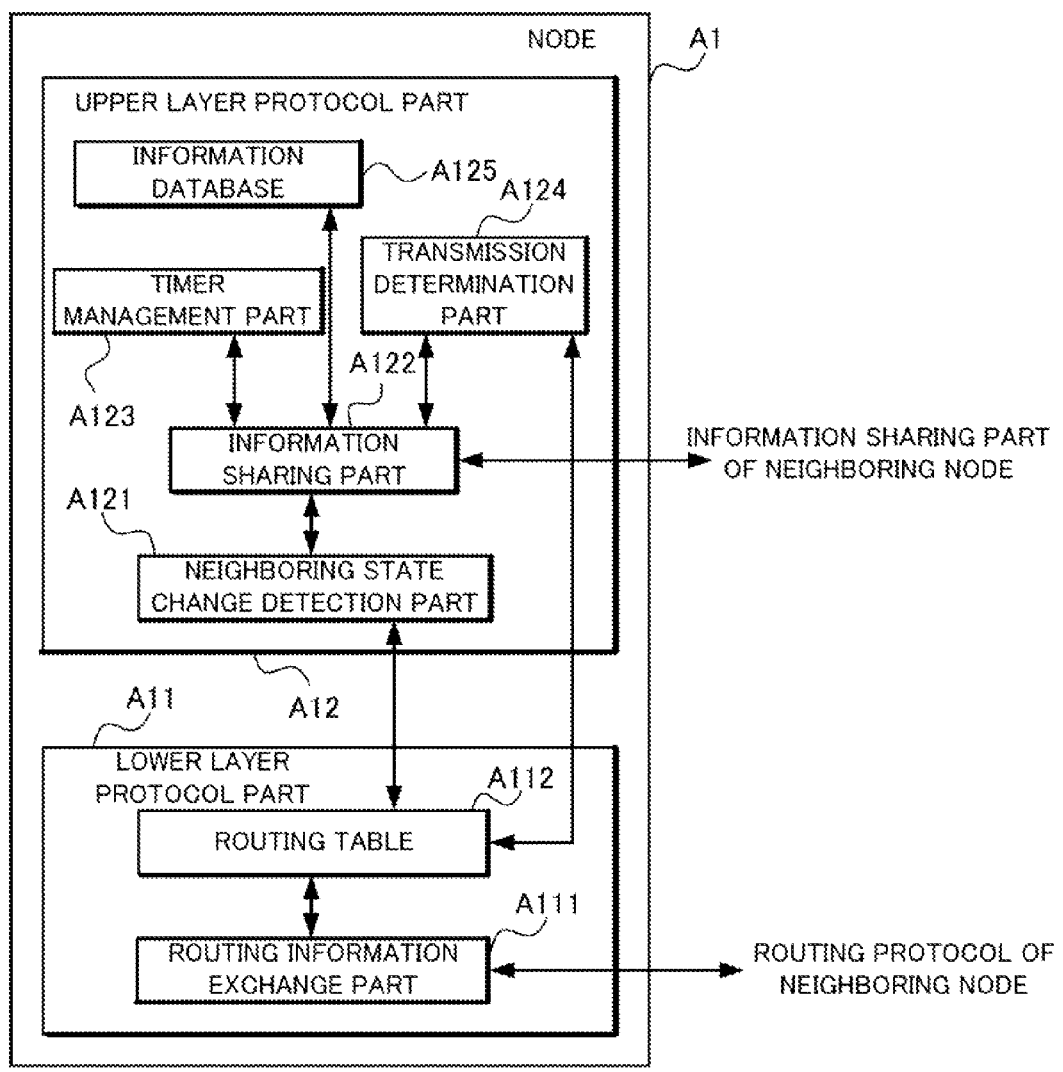
FIG. 1 is a block diagram illustrating a configuration of a node according to a first exemplary embodiment of the present invention.

FIG. 1 is a block diagram illustrating a configuration of a node constituting a network according to the first exemplary embodiment of the present invention.

Figures 2, 3:
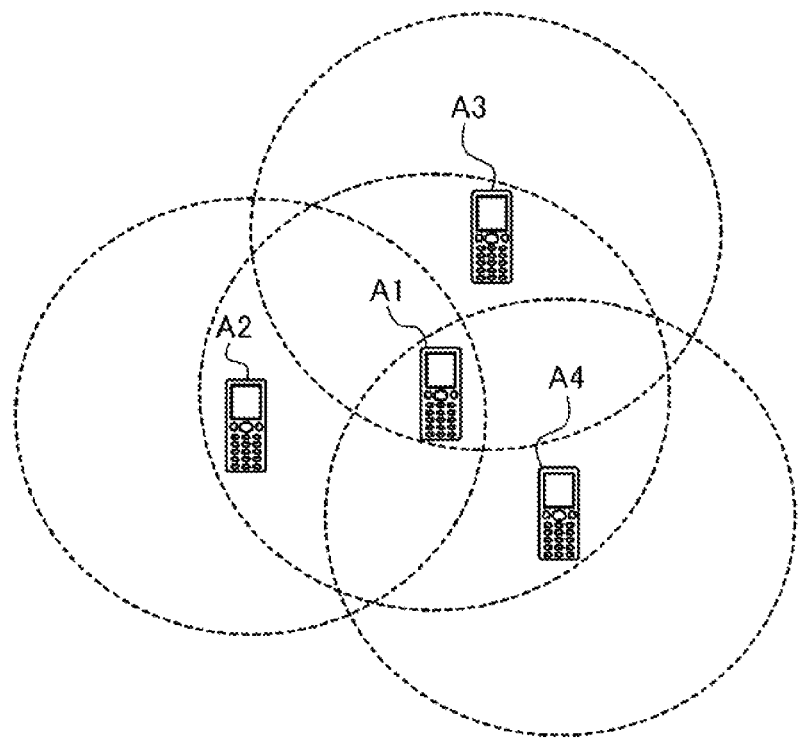
FIG. 2 is a diagram illustrating an example of a wireless ad hoc network according to the first exemplary embodiment of the present invention.
FIG. 3 is a diagram illustrating an example of a routing table according to the first exemplary embodiment of the present invention.

Instead of operating independently, a node A1 according to the first exemplary embodiment shown in FIG. 1 functions as one node in a wireless ad hoc network as shown in FIG. 2.

Each of nodes A2 to A4 in the wireless ad hoc network shown in FIG. 2 has the same function as that of the node A1. In FIG. 2, a circle shown by the dotted line centered on each node represents a range covered by the electric wave from each node, and other nodes that are present within the circle centered on a node are recognized as neighboring nodes.

The node A1 includes a lower layer protocol part A11 and an upper layer protocol part A12.

The lower layer protocol part A11 is a protocol for exchanging information in a lower layer in a network relative to the upper layer protocol part A12.

For example, if the upper layer protocol part A12 is a protocol for exchanging application level information, an example of the lower layer protocol includes an IP routing protocol, which is a layer 3 protocol. As another example, the upper layer protocol part A12 may be an IP routing protocol, and the lower layer protocol part A11 may be a neighboring state monitoring protocol in a data link layer.

The present exemplary embodiment will be described assuming that the upper layer protocol part A12 is a protocol for exchanging application level information, the lower layer protocol part A11 is a protocol for exchanging IP level information, and these pieces of information are exchanged on the wireless network.

A routing protocol in the wireless ad hoc network, such as OLSR (Optimized Link State Routing Protocol) and AODV (Ad Hoc On Demand Distance Vector Algorithm) is used as the lower layer protocol part A11.

The lower layer protocol part A11 includes a routing information exchange part A111 and a routing table A112.

The routing information exchange part A111 exchanges information such as node information and topology information with neighboring nodes, generates a routing entry based on the exchanged information, and updates the routing table A112 according to the generated routing entry.

The routing table A112 is a table for storing the routing entry generated by the routing information exchange part A111.

An example of the routing table A112 is shown in a routing table 101 in FIG. 3. Referring to the routing table 101 shown in FIG. 3, for each destination IP address, the IP address of a node that is to be the next hop is shown.

Which node exists as a neighboring node can be determined by detecting an entry for which the next hop IP address is identical to the destination IP address in the routing table A112. In the case of FIG. 3, it is determined that three nodes having IP addresses "10.0.0.1", "10.0.0.6" and "10.0.0.19" are present as the neighboring nodes of the node A1.

The upper layer protocol part A12 is a protocol for exchanging information in an upper layer in the network relative to the lower layer protocol part A11.

The upper layer protocol part A12 includes a neighboring state change detection part A121, an information sharing part A122, a timer management part A123, a transmission determination part A124 and an information database A125.

The neighboring state change detection part A121 periodically accesses the routing table A112 to check whether or not the state of a neighboring node has changed (hereinafter referred to as "change in the neighboring state") compared to the neighboring nodes when the information sharing message was transmitted the last time. When a change in the neighboring state is detected, the neighboring state change detection part A121 triggers the transmission of the information sharing message in the information sharing part A122.

The information sharing part A122 comprises a function for sharing various types of information with the neighboring nodes in the upper layer so that the nodes operate as distributed systems.

When the upper layer protocol part A12 is a protocol for exchanging application level information, examples of information to be shared include a node ID, a user ID, positional information and a retained contents list, of the node A1.

The information sharing part A122 follows a timer managed by the timer management part A123 to periodically transmit information stored in the information database A125 to the neighboring nodes as an information sharing message.

The information sharing part A122 periodically transmits the information sharing message to the neighboring nodes in addition to when the neighboring state change detection part A121 triggers the transmission of the information sharing message. The information sharing message is broadcasted to all nodes that are present in the range shown by the dotted line centered on the node A1 shown in FIG. 2 (i.e., neighboring nodes).

The timer management part A123 manages the cycle for the information sharing part A122 to periodically transmit the information sharing message to the neighboring nodes.

When the neighboring state change detection part A121 detects a change in the neighboring state in the routing table A112, the transmission determination part A124 determines whether or not the information sharing part A122 transmits the information sharing message to the neighboring nodes according to the contents of a state change in the neighboring state.

That is, when neighboring state change detection part A121 detects the change in the neighboring state, instead of unconditionally transmitting the information sharing message to the neighboring nodes, the transmission determination part A124 determines that the information sharing message is to be transmitted if a transmission condition established according to the contents of the change in the neighboring state described below is satisfied, and determines that the information sharing message is not to be transmitted if the transmission condition is not satisfied.

An example of an algorithm (transmission condition) will be described below on which the transmission determination part A124 determines whether or not to an information sharing message is to be transmitted.

In a first algorithm, it is determined that an information sharing message is to be transmitted if, compared to the nodes that were neighbored when the information sharing message was transmitted the last time, the ratio of the newly added neighboring nodes is equal to or greater than a preset threshold value.

Here, the ratio of the newly added neighboring nodes is obtained by the arithmetic expression: (number of new neighboring nodes added since information sharing message was transmitted the last time)/(number of all neighboring nodes at the current time).

On the other hand, no information sharing message is transmitted if, compared to the nodes that were neighbored when the information sharing message was transmitted the last time, the ratio of the newly added neighboring nodes is less than the threshold value.

This threshold value is set to such ratio that allows for the determination that even if a new information sharing message was transmitted, the effect thereof would be limited. For example, "0.2" or the like is set to all the neighboring nodes.

In this first algorithm, it is determined that no information sharing message is to be transmitted if, compared to the nodes that have received the information sharing message that was transmitted the last time, the ratio of the number of the newly added neighboring nodes is less than a predetermined ratio because it is determined that even if a new information sharing message was transmitted, the effect thereof would be limited. An effect that reduces the network load caused by transmission of unnecessary information sharing messages can be expected by controlling the transmission of information sharing messages with such determination.

In a second algorithm, it is determined that the information sharing message is to be transmitted if, compared to the nodes that were neighbored when the information sharing message was transmitted the last time, the number of the newly added neighboring nodes is equal to or greater than a preset threshold value.

On the other hand, no information sharing message is transmitted if, compared to the nodes that were neighbored when the information sharing message was transmitted the last time, the number of the newly added neighboring nodes is less than the threshold value.

This threshold value is set to such the number of nodes that allows for the determination that even if a new information sharing message were transmitted, the effect thereof would be limited; it can be readily understood that the threshold value is changed depending on the number of all the neighboring nodes.

In this second algorithm, even if the neighboring state has changed, if, compared to the nodes that have received the information sharing message that was transmitted the last time, less than a given number of nodes were newly added as neighboring nodes, it is determined, similarly to the first algorithm, that even if a new information sharing message were transmitted, the effect thereof would be limited, thereby determining that the transmission is not to be made.

Similarly to the first algorithm, an effect that reduces the network load caused by transmission of unnecessary information sharing messages can be expected by controlling the transmission of information sharing messages with such determination.

In a third algorithm, if, among the nodes that were neighbored when the information sharing message was transmitted the last time, the number of neighboring nodes remaining with still no change in the neighboring state is less than a preset threshold value, it is determined that the information sharing message is to be transmitted.

On the contrary, if, among the nodes that were neighbored when the information sharing message was transmitted the last time, the number of neighboring nodes remaining with no change is equal to or greater than the threshold value, no information sharing message is transmitted.

This threshold value is also set to such the number of nodes that allows for the determination that even if a new information sharing message were transmitted, the effect thereof would be limited.

In this third algorithm, even if the neighboring state has changed, since a case where a given number of nodes or more that have received the information sharing message that was transmitted the last time still exist as neighboring nodes means that a given number of nodes or more are in a state of retaining information on the node in question as a neighboring node, it is determined that no new information sharing message is to be transmitted.

Similarly to the first and second algorithms, an effect that reduces the network load caused by transmission of unnecessary information sharing messages can be expected by controlling the transmission of information sharing messages with such determination.

The information database A125 is a storage device for storing information to be shared through the information sharing part A122. Both of information on the node in question and information on other nodes are stored.

In the configuration of the node shown in FIG. 1, only characteristic components of the present invention are shown, and other components are omitted for simplicity of the description.

A hardware configuration of the node A1 will now be described.

Figure 4:
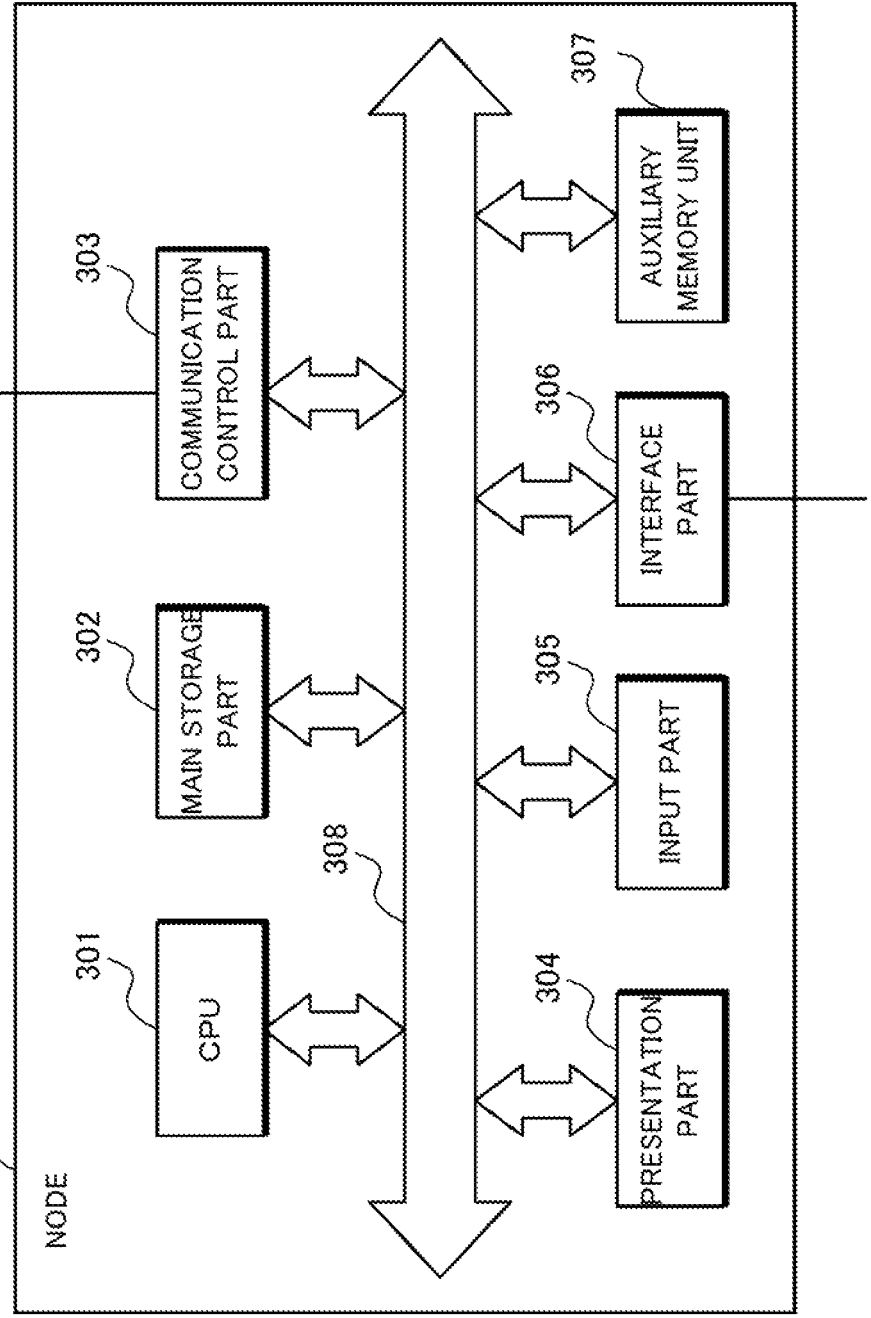
FIG. 4 is a block diagram illustrating a hardware configuration of the node according to the first exemplary embodiment.

FIG. 4 is a block diagram illustrating a hardware configuration of the node A1 according to the first exemplary embodiment.

Referring to FIG. 4, the node A1 may be achieved with the similar hardware configuration to that of a general computer device, and comprises a CPU (Central Processing Unit) 301, and a main storage part 302, which is a main memory such as a RAM (Random Access Memory), and is used for as a work area for data and a temporary save area for data.

The node A1 also comprises a communication control part 303 for transmitting/receiving information on the wireless network, a presentation part 304 such as a liquid crystal display, a printer and a speaker, an input part 305 such as a keyboard and a mouse, an interface part 306, which is connected to peripheral equipment to transmit/receive data, an auxiliary memory unit 307, which is a hard disk device formed of a nonvolatile memory such as a ROM (Read Only Memory), a magnetic disk and a semiconductor memory, a system bus 308 for interconnecting each components described above of the information processing unit and the like.

The node A1 according to the present invention can achieve its operation obviously in hardware by implementing in the node A1 a circuit component comprising a hardware component such as an LSI (Large Scale Integration (LSI)) in which a program for achieving functions of the lower layer protocol part A11 and the upper layer protocol part A12 are incorporated, as well as in software by executing a program for providing each function of each component described above with the CPU 301 on the computer processing device.

In other words, the CPU 301 loads into the main storage part 302 and executes the program (program achieving the functions of the lower layer protocol part A11 and the upper layer protocol part A12) stored in the auxiliary memory part 307, and controls the operation of the node A1 to achieve each function described above in software manner.

Next, the operation when the neighboring state has changed in the node A1 according to the present exemplary embodiment will be described in detail with reference to FIG. 5.

First, the neighboring state change detection part A121 of the node A1 refers to the routing table A112 (step S101 in FIG. 5) to determine whether or not the neighboring nodes has changed compared to the nodes that were neighbored when the information sharing message was transmitted the last time (change in the neighboring state) (step S102). If there is no change in the neighboring state in step S102, the method returns to step S101.

If it is determined that the neighboring state has changed in step S102, the ratio of the new neighboring nodes added since the information sharing message was transmitted the last time is calculated (step S103), and whether or not the value of the ratio is equal to or greater than a threshold value is checked (step S104).

If the ratio of the newly added neighboring nodes is equal to or greater than the threshold value in step S104, the information sharing message is transmitted to the neighboring nodes (step S105). On the other hand, if it is less than the threshold value, no information sharing message is transmitted, and the method returns to step S101.

Here, although description were given using the first algorithm described above as the algorithm for the determination of whether or not to transmit an information sharing message when the neighboring state has changed, similar consideration is possible additionally when the second or third algorithm described above is used.

Effects of the First Exemplary Embodiment

According to the first exemplary embodiment, when the neighboring state change detection part A121 detects a change in neighboring nodes in the routing table A112, the transmission determination part A124 determines whether or not information to be shared is to be transmitted according to the ratio of the new neighboring nodes added since the information sharing message was transmitted the last time.

In other words, when a change in the neighboring state in the lower layer protocol is detected, instead of immediately transmitting the information sharing message to the neighboring nodes in the upper layer, the ratio of the neighboring nodes that have received the information sharing message the last time and have information on the node in question is deemed to be sufficient if the ratio of the new neighboring nodes added since the last transmission is less than the threshold value, and information sharing message is deliberately not transmitted.

The transmission of the information sharing message is controlled in this manner, thus allowing the load of the information sharing message in the upper layer protocol to be minimized.

On the other hand, if the ratio of the newly added neighboring nodes is equal to or greater than the threshold value, the ratio of the neighboring nodes having the information on the node in question is deemed not to be sufficient, and the information sharing message is transmitted to deliver the information on the node in question to the neighboring nodes, thus allowing effective information sharing to be achieved.

Second Exemplary Embodiment

Next, a second exemplary embodiment of the present invention will be described in detail with reference to the drawings.

Figures 6, 7:
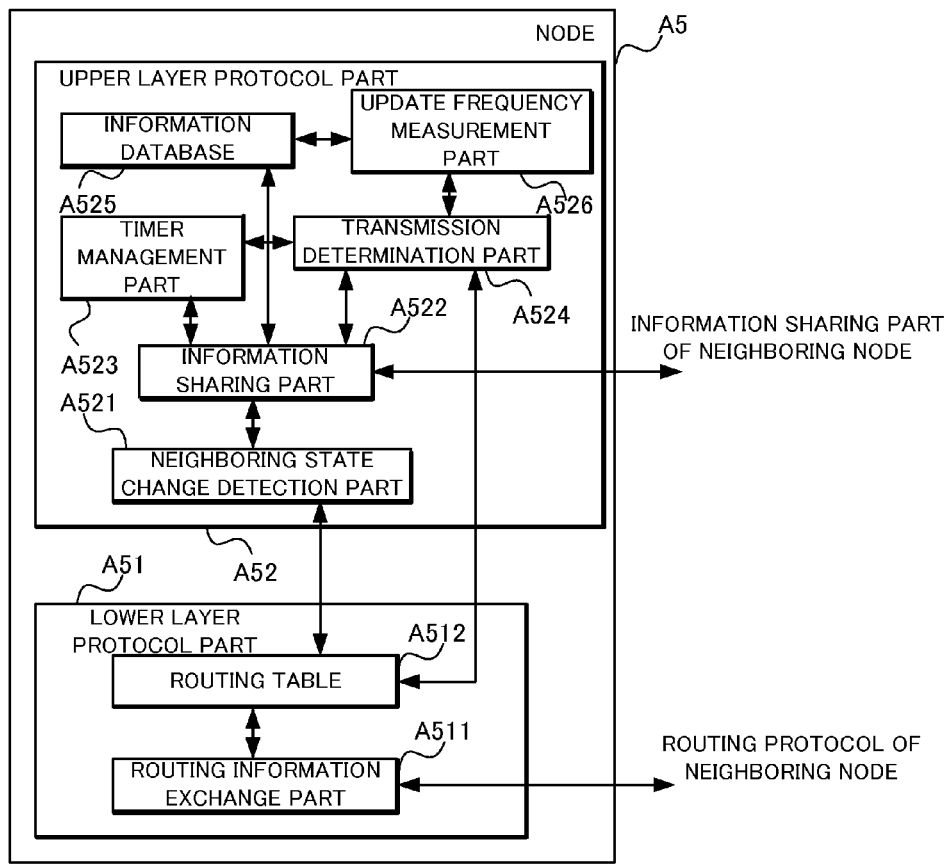
FIG. 6 is a block diagram illustrating a configuration of a node according to a second exemplary embodiment of the present invention.
FIG. 7 is a diagram illustrating an example of a transmission determination table according to the second exemplary embodiment of the present invention.

FIG. 6 is a block diagram illustrating a configuration of a node constituting a network according to the second exemplary embodiment of the present invention.

Referring to FIG. 6, similarly to the node A1 in the first exemplary embodiment, a node A5 according to the second exemplary embodiment of the present invention functions as one node in the wireless ad hoc network as shown in FIG. 2.

Similarly to the node A1, the node A5 includes a lower layer protocol part A51 and an upper layer protocol part A52. The lower layer protocol part A51 has the same configuration as that of the lower layer protocol part A11 in the node A1.

The upper layer protocol part A52 corresponds to the upper layer protocol part A12 in the node A1, and includes a neighboring state change detection part A521, an information sharing part A522, a timer management part A523, a transmission determination part A524, an information database A525 and an update frequency measurement part A526.

Among them, the neighboring state change detection part A521, the information sharing part A522, the timer management part A523, the transmission determination part A524 and the information database A525 correspond to the neighboring state change detection part A121, the information sharing part A122, the timer management part A123, the transmission determination part A124 and the information database A125, respectively in the node A1 described in the first exemplary embodiment, therefore, detailed description thereof is omitted.

The update frequency measurement part A526 periodically accesses the information database A525 to measure the update frequency of each information stored.

Here, the update frequency means the number of times information is updated per predetermined time period (unit time). As a value of the update frequency, a most recent value may be used, or a value smoothed by a moving average or a weighted moving average may be used.

Example of information stored in the information database A525 include a node ID, a user ID, positional information and a retained contents list, of the node A5. Here, since information such as the node ID and the user ID changes extremely rarely, the update frequency is measured to be low, and regarding positional information, the update frequency is measured to be high for high-speed movement, and conversely measured to be low for low-speed movement. In this manner, the observed update frequency is different depending on the type of information.

When the neighboring state change detection part A521 detects a change in the neighboring state in the routing table A152, the transmission determination part A524 determines whether or not the information sharing part A522 transmits the information sharing message to the neighboring nodes according to the contents of the change in the neighboring state.

At that time the transmission determination part A524 determines that transmission is to be made when the ratio of the newly added neighboring nodes is equal to or greater than the threshold value compared to the nodes that were neighbored when the information sharing part A522 transmitted the information sharing message the last time, or determines that transmission is not to be made when the ratio is less than the threshold value.

Here, according to the second exemplary embodiment, the threshold value (transmission condition) is reset (updated) depending on the type of the information to be shared, so that whether or not transmission is to be made is determined according to the threshold value updated based on the update frequency of each information measured by the update frequency measurement part A526.

Specifically, the higher the update frequency of the information, the lower the threshold value of the ratio of the newly added neighboring nodes is set to be. This is because the higher the update frequency, the higher the possibility that the information to be transmitted has been updated compared to the information that was transmitted until the last time.

On the other hand, the lower the update frequency of the information, the higher the threshold value of the ratio of the newly added neighboring nodes is set to be. This is because the lower the update frequency, the lower the possibility that the information to be transmitted has been updated compared to the information that was transmitted until the last time.

The transmission determination part A524 comprises a transmission determination table 102 as shown in FIG. 7, and periodically updates the threshold value for each information.

Referring to the transmission determination table 102 in FIG. 7, the update frequency and the threshold value of the ratio of the newly added neighboring nodes are set for each type of information. When a change in the neighboring state leading to the ratio of the new neighboring nodes to be equal to or greater than the threshold value is detected from this transmission determination table 102, the information sharing message including the information corresponding to the threshold value is transmitted to the neighboring nodes.

When the neighboring state change detection part A521 detects the change in the neighboring state, and when the transmission determination part A524 determines that the information sharing message is to be transmitted, the information sharing part A522 transmits the information sharing message to the neighboring nodes, however, at that time, instead of transmitting all the information, the information sharing part A522 transmits only information corresponding to the threshold value when the ratio of the newly added neighboring nodes is equal to or greater than the threshold value.

For example, assuming that the transmission determination table is the transmission determination table 102 shown in FIG. 7, and the ratio of the newly added neighboring nodes is 0.5, information for which the ratio of the corresponding new neighboring nodes is equal to or greater than the threshold value is only the positional information and retained contents list, therefore, only these two pieces of information are included in the information sharing message and transmitted.

The transmission of the information sharing message is controlled in this manner, thus allowing the amount of messages to be reduced according to the ratio of the newly added neighboring nodes.

The threshold value of the ratio of the new neighboring nodes is set for each information based on the update frequency for each information in this manner, thus allowing the load of the information sharing message to be reduced, and effective information sharing to be achieved depending on the characteristics of information.

Although the description were given for the determination of whether or not to transmit an information sharing message based on the ratio of the newly added neighboring nodes, additionally, as described in the first exemplary embodiment, whether or not to transmit an information sharing message may be determined depending on:

(1) the number of the newly added neighboring nodes compared to the nodes that were neighbored when the information sharing message was transmitted the last time, (2) the number of neighboring nodes remaining with no change among the nodes that were neighbored when the information sharing message was transmitted the last time.

When whether or not the transmission is required is determined based on the number of the newly added neighboring nodes, the higher the update frequency of the information, the lower the threshold value is set to be, on the other hand, the lower the update frequency of the information, the higher the threshold value is set to be.

When whether or not the transmission is required is determined based on the number of the neighboring nodes remaining with no change, the higher the update frequency of the information, the higher the threshold value is set to be, on the other hand, the lower the update frequency of the information, the lower the threshold value is set to be.

Next, the operation when the neighboring state has changed in the node A5 according to the present exemplary embodiment will be described in detail with reference to FIG. 8.

Figure 5:
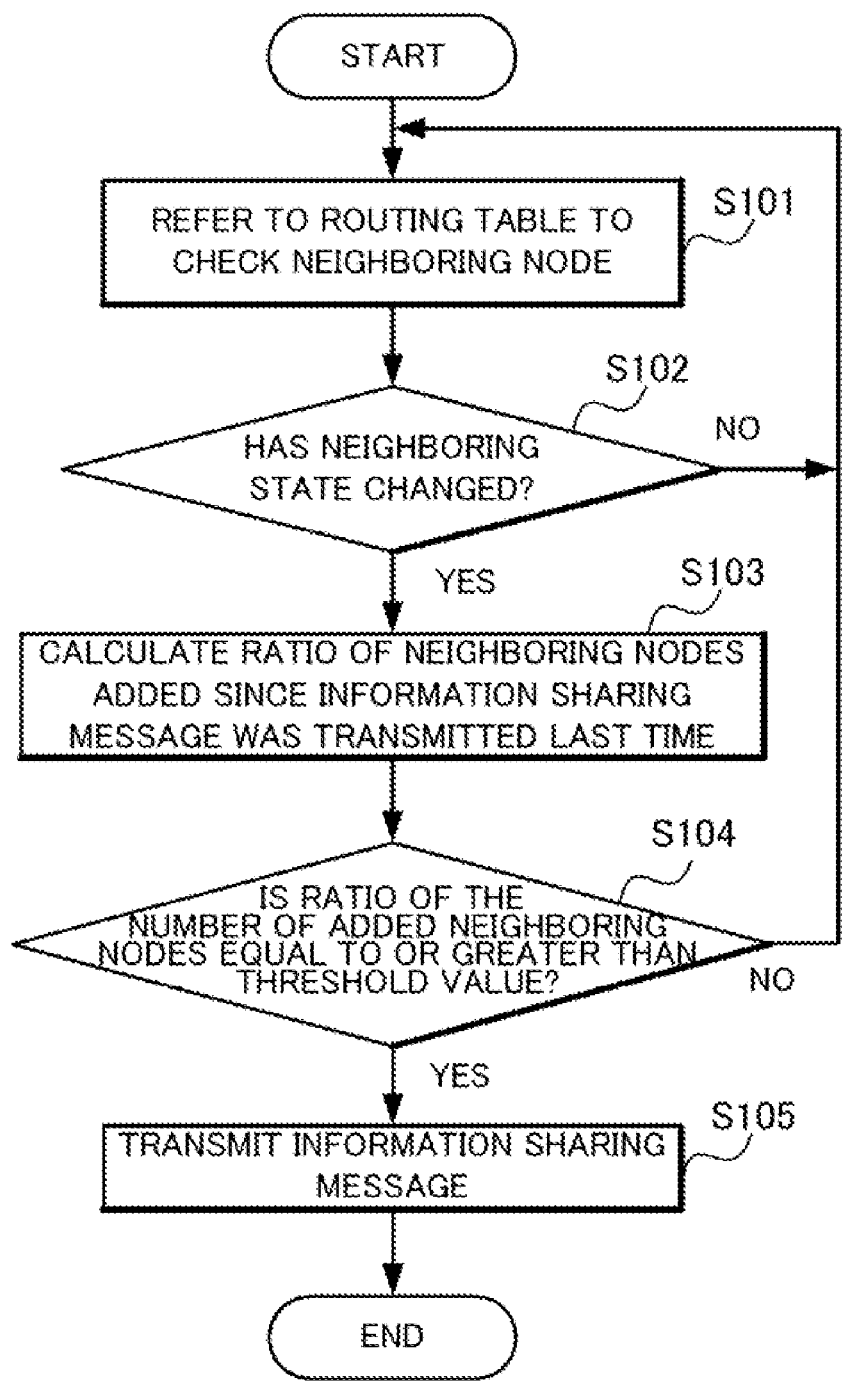
FIG. 5 is a flowchart illustrating an operation when a neighboring state has changed according to the first exemplary embodiment of the present invention.

Steps S201 to S203 are similar to the operations of steps S101 to S103 shown in FIG. 5, described in the first exemplary embodiment.

After the processing in step S203, reference to the transmission determination table 102 is made in the transmission determination part A524 (step S204) to check whether or not there is information for which the ratio of the new neighboring nodes calculated in step S203 is equal to or greater than the threshold value set for each type of information (step S205).

If there is information for which the ratio of the new neighboring nodes is equal to or greater than the threshold value in step S205, the information sharing message including only the applicable information is transmitted to the neighboring nodes (step S206). If there is no information, no information sharing message is transmitted, and the method returns to step S201.

Here, although description was given for the determination of whether or not to transmit a message based on the ratio of the new neighboring nodes, similar consideration is possible additionally when whether or not to transmit a message is determined based on another algorithm described in the first exemplary embodiment.

Effects of the Second Exemplary Embodiment

In the second exemplary embodiment, the upper layer protocol part A52 comprises the update frequency measurement part A526 to measure the update frequency of each information to be shared. Then, the transmission determination part A524 sets for each information, the threshold value serving as the criteria of determination as to whether or not to transmit information when the neighboring state has changed based on the measured update frequency. If the neighboring state has changed, only information for which the ratio of the newly added neighboring nodes is equal to or greater than the threshold value is included in the information sharing message and transmitted to the neighboring nodes.

Especially, by setting the threshold value for information with a higher update frequency to be low, on the other hand, setting the threshold value for information with a lower update frequency to be high, information for which the probability of having been updated compared to the information the node in question has transmitted until the last time is higher will cause the information to be transmitted with a smaller change in the number of neighboring nodes, on the other hand, information for which the possibility of having been updated compared to the information the node in question has transmitted until the last time is lower will cause the information not to be transmitted unless the ratio of the newly added neighboring nodes is high. In this manner, the effect of reducing the messages, and the capability of sharing as new as possible information with the neighboring nodes can both be achieved.

Third Exemplary Embodiment

Next, a third exemplary embodiment of the present invention will be described in detail with reference to the drawings.

Figures 9, 10:
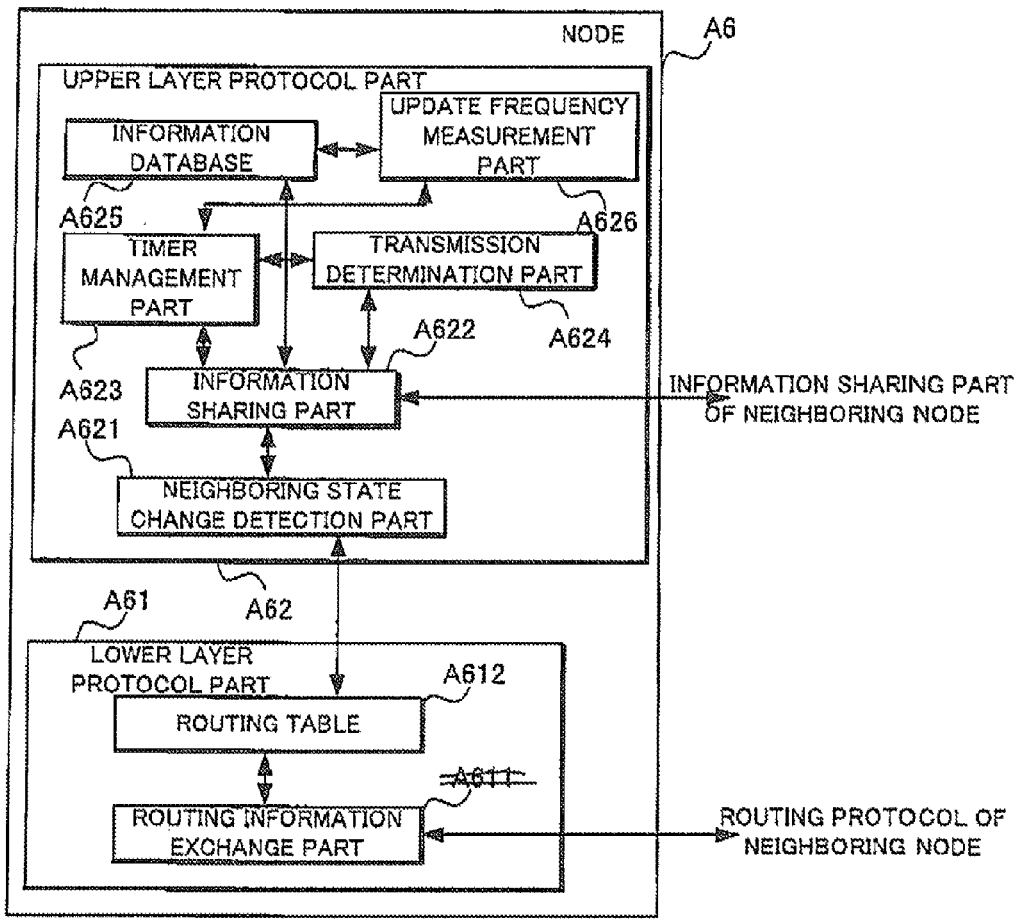
FIG. 9 is a block diagram illustrating a configuration of a node according to a third exemplary embodiment of the present invention.
FIG. 10 is a diagram illustrating an example of a timer table according to the third exemplary embodiment of the present invention.

FIG. 9 is a block diagram illustrating a configuration of a node constituting a network according to the third exemplary embodiment of the present invention.

Referring to FIG. 9, similarly to the node A1 in the first exemplary embodiment, a node A6 according to the third exemplary embodiment of the present invention functions as one node in the wireless ad hoc network as shown in FIG. 2.

Similarly to the node A1, the node A6 includes a lower layer protocol part A61 and an upper layer protocol part A62. The lower layer protocol part A61 has the same configuration as that of the lower layer protocol part A11 in the node A1.

The upper layer protocol part A62 corresponds to the upper layer protocol part A12 in the node A1 in the first exemplary embodiment, and includes a neighboring state change detection part A621, an information sharing part A622, a timer management part A623, a transmission determination part A624, an information database A625 and an update frequency measurement part A626.

Among them, the neighboring state change detection part A621, the information sharing part A622, the transmission determination part A624, the information database A625 and the update frequency measurement part A626 correspond to the neighboring state change detection part A521, the information sharing part A522, the transmission determination part A524, the information database A525 and the update frequency measurement part A526, respectively, in the node A5 described in the second exemplary embodiment, therefore, detailed description thereof is omitted.

For each information to be shared, the timer management part A623 manages two time parameters, t1 and t2, where t1<t2.

(1) t1 is a standby time (shortest update interval), and the information sharing message is controlled so as not to be transmitted until this standby time t1 has elapsed since the information sharing message was transmitted the last time even if the neighboring state has changed.

(2) t2 is the longest update interval, and the information sharing message is unconditionally transmitted when the longest update interval t2 has elapsed since the information sharing message was transmitted the last time, whether or not the neighboring state has changed.

The timer management part A623 sets the values of t1 and t2 depending on each information based on the update frequency of each information measured by the update frequency measurement part A626.

At that time, the higher the update frequency of the information, the lower the values of t1 and t2 are set to be, and the lower the update frequency of the information, the higher the values of t1 and t2 are set to be.

The timer management part A623 logically comprises a timer table 103 as shown in FIG. 10, and periodically updates the standby time t1 and the longest update interval t2. Referring to the timer table 103 in FIG. 10, the update frequency and the values of t1 and t2 are shown for each type of information.

When the neighboring state change detection part A621 detects a change in the neighboring state in the routing table A612, the transmission determination part A624 determines whether or not the information sharing part A622 transmits the information sharing message to the neighboring nodes according to the contents of the change in the neighboring state. At that time, by referring to the timer table 103 managed by the timer management part A623, whether or not to transmit the information sharing message is determined.

When the neighboring state change detection part A621 detects the change in the neighboring state, and when the transmission determination part A624 determines that the information sharing message is to be transmitted, the information sharing part A622 transmits the information sharing message to the neighboring nodes, however, at that time, instead of transmitting all the information, the information sharing part A622 transmits only information required to be transmitted based on the timer table 103 managed by the timer management part A623.

For example, it is assumed that the timer table 103 is in a state as shown in FIG. 10, and that transmitted the last time to the neighboring nodes through the information sharing message were "node ID" 20 seconds ago, "user ID" 80 seconds ago, and "positional information" and "retained contents list" 15 seconds ago.

In this case, only information "user ID" and "positional information", for which the time elapsed since the last transmission is equal to or longer than the standby time t1, is included in the information sharing message and transmitted to the neighboring nodes.

Next, the operation when the neighboring state has changed in the node A6 according to the present exemplary embodiment will be described in detail with reference to FIG. 11.

Steps S301 to S302 are similar to the operations of steps S101 to S102 shown in FIG. 5, described in the first exemplary embodiment.

In step S302, if the neighboring state has changed, reference to the timer table 103 is made managed by the timer management part A623 (step S303) to check whether or not there is information for which the time since the last transmission is equal to or longer than the standby time t1 (step S304).

In addition, in step S302, if the neighboring state has changed, the method proceeds to step S306.

In step S304, if there is information for which the time since the last transmission is equal to or longer than the standby time t1, the information sharing message including only the information is transmitted to the neighboring nodes (step S305). If there is no information, the method returns to step S301.

In step S306, whether or not there is information for which the time since the last transmission is equal to or longer than the longest update interval t2 is checked. If there is the applicable information, the method proceeds to step S305, where the information sharing message including only the information is transmitted to the neighboring nodes.

If there is no information for which the time since the last transmission is equal to or longer than the longest update interval t2, the method returns to step S301.

Effects of the Third Exemplary Embodiment

According to the third exemplary embodiment, the timer management part A623 in the upper layer protocol part A62 sets the standby time t1 and the longest update interval t2, which are the threshold values of the update interval, based on the update frequency of each information to be shared measured by the update frequency measurement part A626. Then, when the neighboring state has changed, the transmission determination part A624 includes only the information for which the time since the last transmission is equal to or longer than the standby time t1 in the information sharing message and transmits it to the neighboring nodes. In addition, even if the neighboring state has not changed, the transmission determination part A624 also includes the information for which the time since the last transmission is equal to or longer the longest update interval t2 in the information sharing message and transmits it to the neighboring nodes.

Specifically, by setting t1 and t2 to be low for information with high update frequency, on the other hand, setting t1 and t2 to be high for information with low update frequency, the higher the possibility that the information has been updated compared to information the node in question has transmitted until the last time, the shorter the interval at which the information is transmitted becomes, on the other hand, the lower the possibility that the information has been updated compared to information the node in question has transmitted until the last time, the longer the interval at which the information is transmitted becomes. Further, using the two threshold values t1 and t2, the information is always transmitted at t2 intervals, and if there has been a change in the neighboring state, the information is transmitted promptly with an interval of t1 or longer.

The transmission of the information sharing message controlled in this manner, thus the effect of reducing the messages, and the capability of sharing as new as possible information with the neighboring nodes can both be achieved.

Fourth Exemplary Embodiment

Next, a fourth exemplary embodiment of the present invention will be described in detail with reference to the drawings.

The fourth exemplary embodiment has a configuration of the combination of the second exemplary embodiment and the third exemplary embodiment described above.

Figure 12:
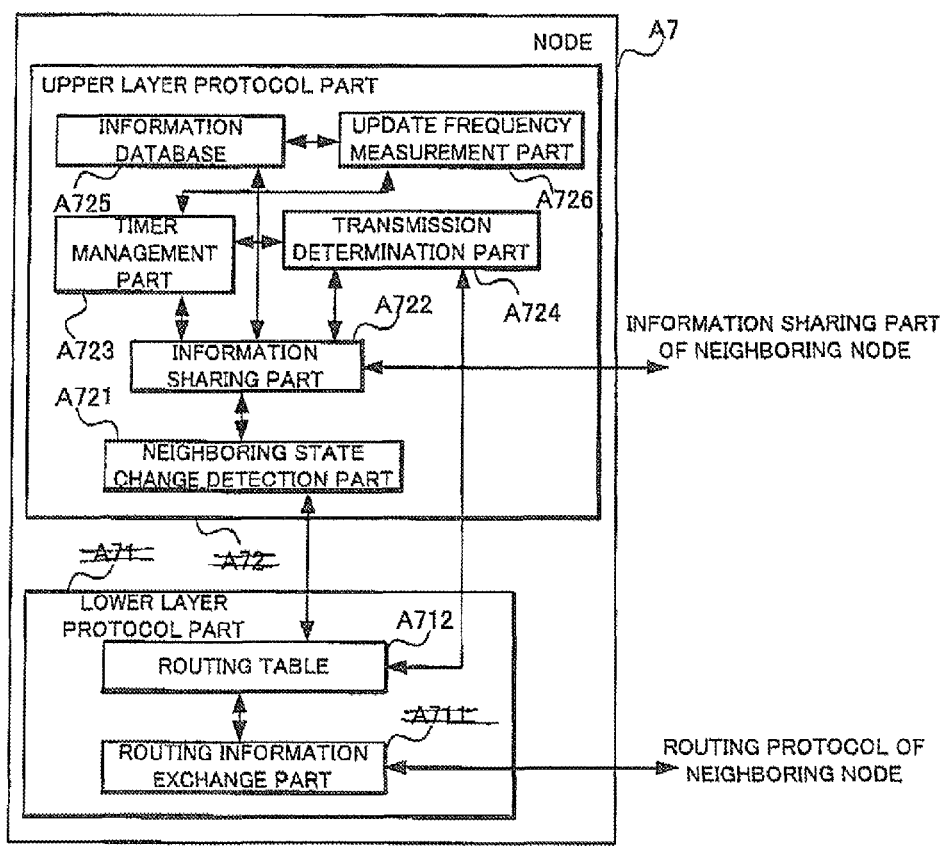
FIG. 12 is a block diagram illustrating a configuration of a node according to a fourth exemplary embodiment of the present invention.

FIG. 12 is a block diagram illustrating a configuration of a node constituting a network according to the fourth exemplary embodiment of the present invention.

Referring to FIG. 12, similarly to the node A1 in the first exemplary embodiment, a node A7 according to the fourth exemplary embodiment of the present invention functions as one node in the wireless ad hoc network as shown in FIG. 2.

A neighboring state change detection part A721, an information sharing part A722, an information database A725, and an update frequency measurement part A726 of the node A7 correspond to the neighboring state change detection part A521, the information sharing part A522, the transmission determination part A524, the information database A525, and the update frequency measurement part A526, respectively, in the node A5 described in the second exemplary embodiment. In addition, a timer management part A723 corresponds to the timer management part A623 in the third exemplary embodiment. The detailed description of these components is omitted.

Although the node A7 has the similar configuration to that of the node A6 in the third exemplary embodiment, the node A7 is different from the node A6 in that a transmission determination part A724 has a function of accessing a routing table A712, and acquiring the content of the change in the neighboring state, similarly to the transmission determination part A524 in the second exemplary embodiment.

In other words, the transmission determination part A724 of the node A7 according to the fourth exemplary embodiment comprises the transmission determination table 102 as shown in FIG. 7 similarly to the transmission determination part A524 in the second exemplary embodiment, and, when the change in the neighboring state is detected for which the ratio of the new neighboring nodes is equal to or greater than the threshold value from the transmission determination table 102, determines that the information sharing message including the information corresponding to the threshold value is to be transmitted to the neighboring nodes.

In addition, similarly to the transmission determination part A624 in the third exemplary embodiment, the transmission determination part A724 of the node A7 refers to the timer table 103 managed by the timer management part A623 to determine whether or not the information sharing message is to be transmitted.

Figure 13:
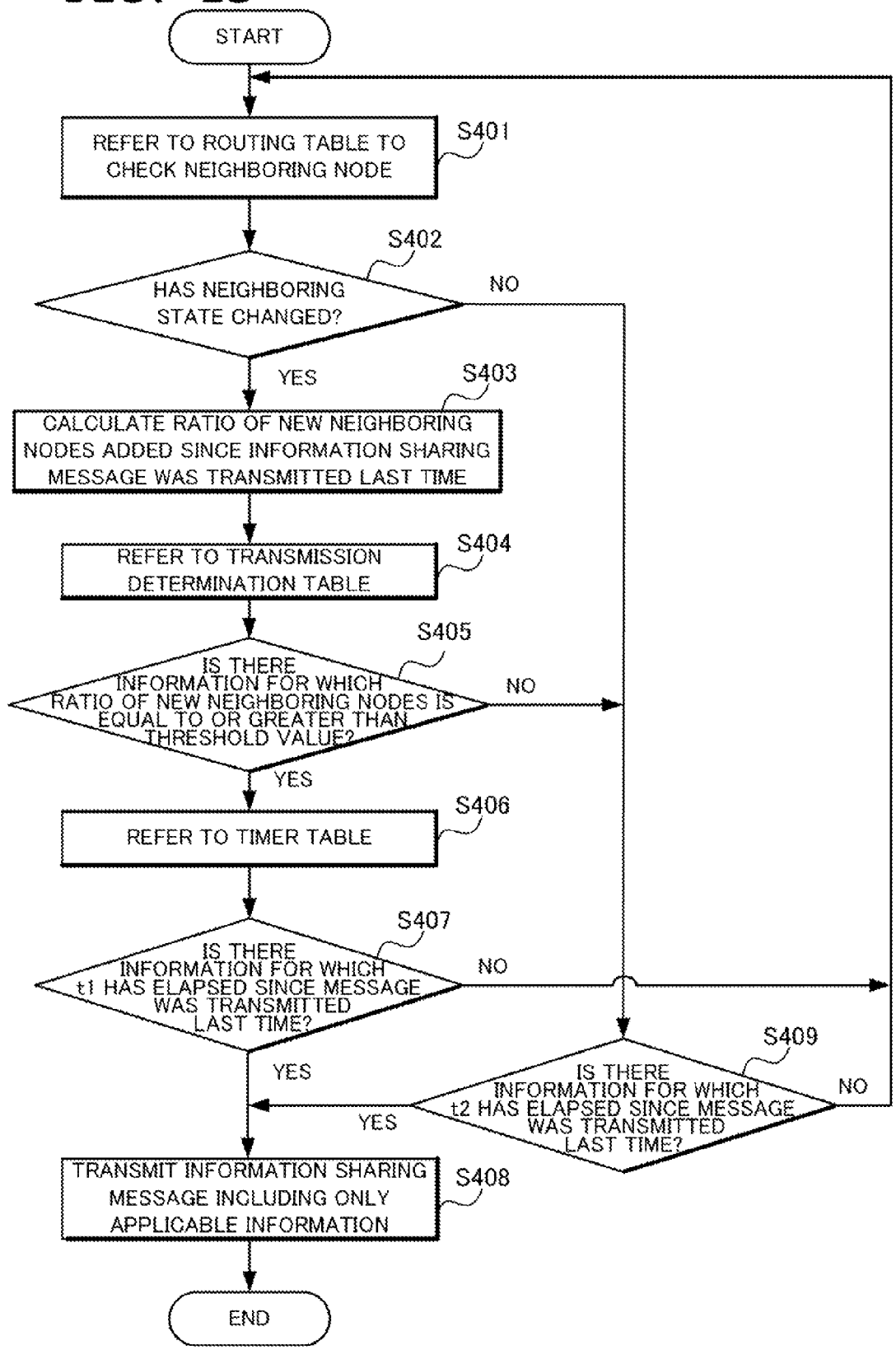
FIG. 13 is a flowchart illustrating an operation when a neighboring state has changed according to the fourth exemplary embodiment of the present invention.

Next, the operation when the neighboring state has changed in the node A7 according to the present exemplary embodiment will be described in detail with reference to FIG. 13.

Figure 8:
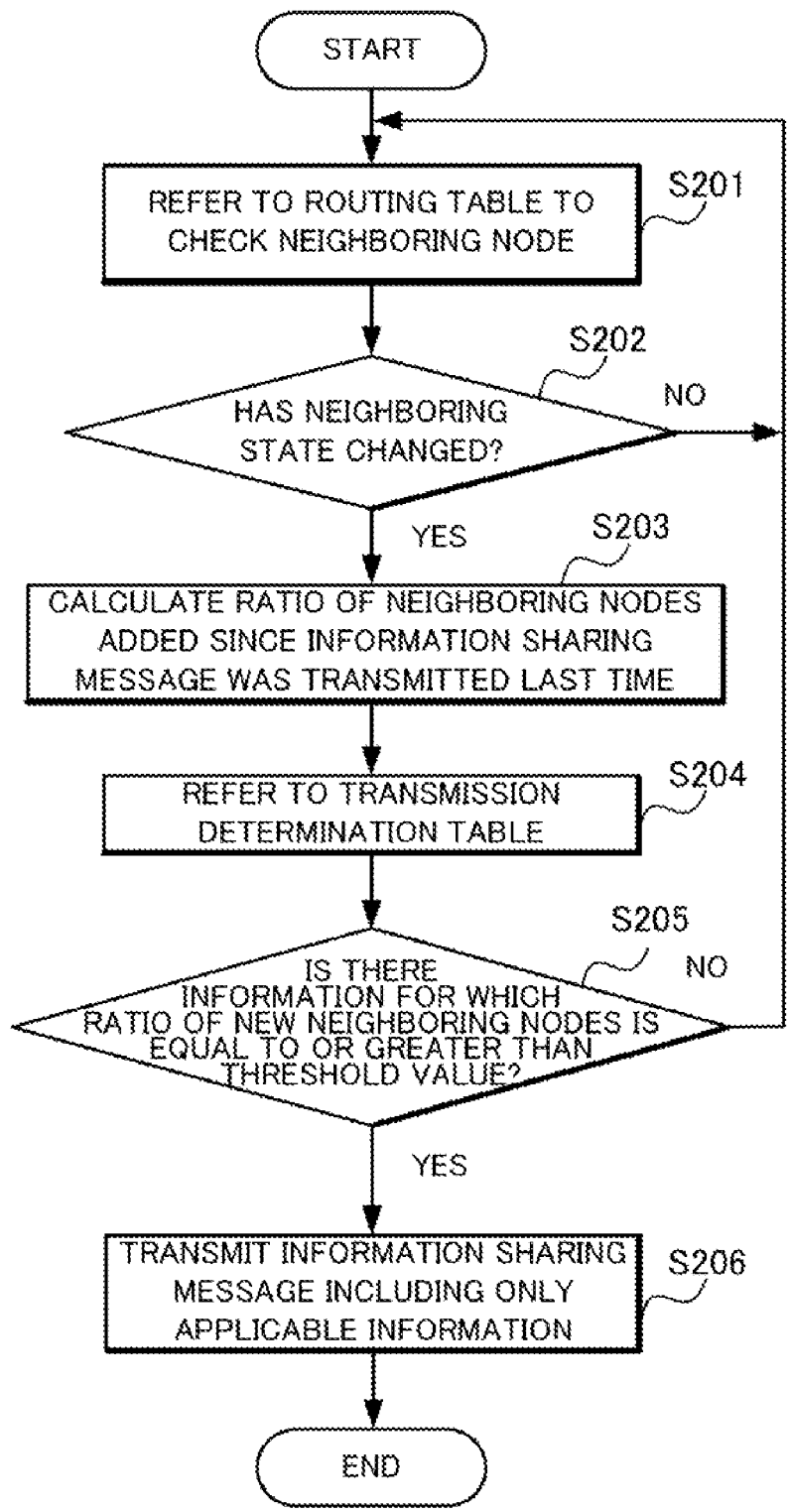
FIG. 8 is a flowchart illustrating an operation when a neighboring state has changed according to the second exemplary embodiment of the present invention.

Steps S401 to 405 are similar to the operations of steps S201 to S205 shown in FIG. 8, described in the second exemplary embodiment. However, in steps S402 and S405, respectively, if there is no change in the neighboring state, and if there is no information for which the ratio of the newly added neighboring nodes is equal to or greater than the threshold value, the method proceeds to step S409.

In addition, in step S405, if there is information for which the ratio of the new neighboring nodes is equal to or greater than the threshold value, the method proceeds to step S406.

Figure 11:
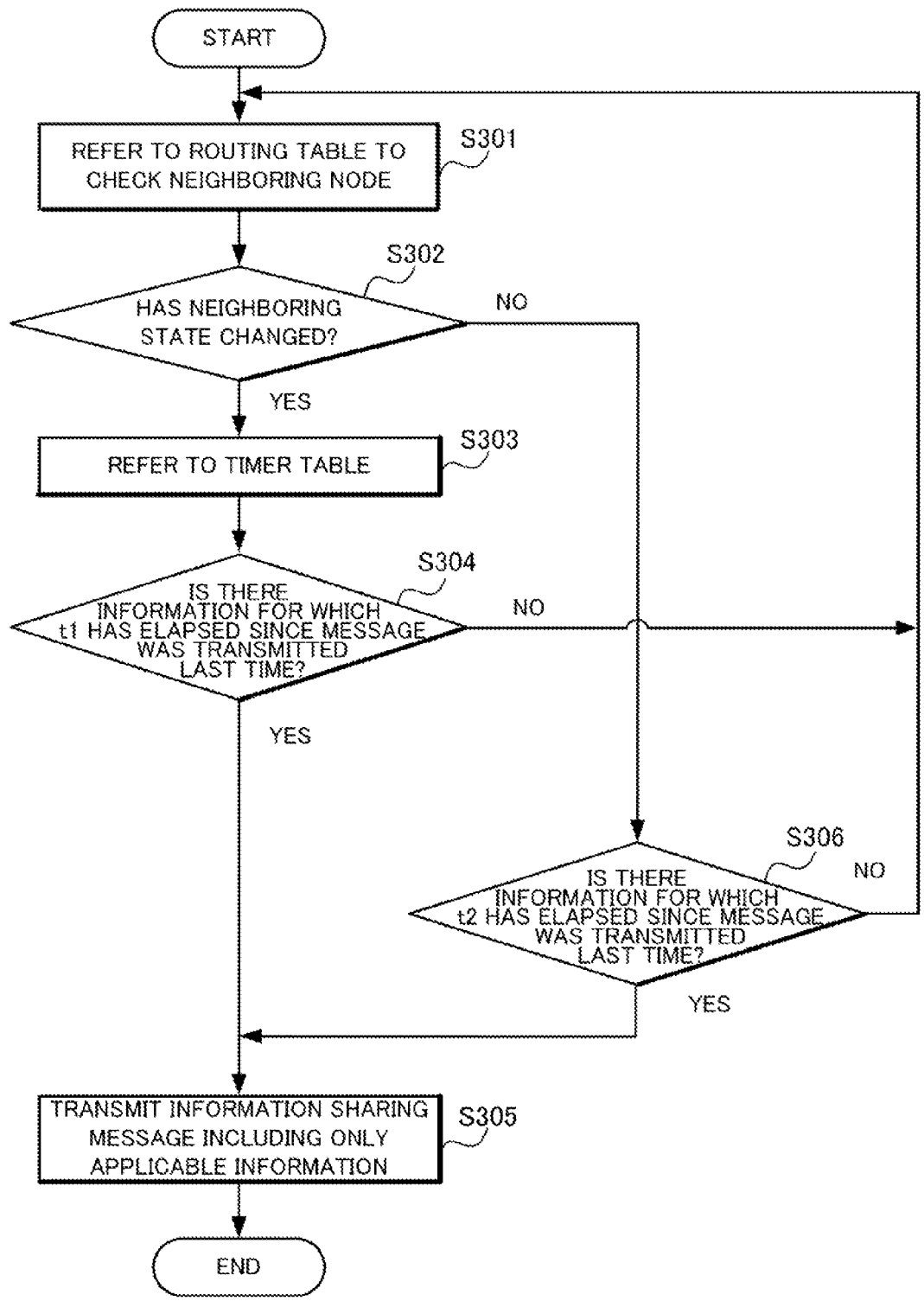
FIG. 11 is a flowchart illustrating an operation when a neighboring state has changed according to the third exemplary embodiment of the present invention.

Next, steps S406 to S408 are similar to the operation of steps S303 to S305 shown in FIG. 11, described in the third exemplary embodiment. In step S407, if there is no information for which the time since a message was transmitted the last time has elapsed standby time t1 or longer, the method proceeds to step S401.

In step S409, if there is information for which the time since the last transmission is equal to or longer than the longest update interval t2, the method proceeds to step S408, and the information sharing message including only the information is transmitted to the neighboring nodes.

Although, in step 405, description were given for the determination based on the ratio of the new neighboring nodes, additionally, the determination is obviously possible based on another algorithm described in the first exemplary embodiment.

Effects of the Fourth Exemplary Embodiment

According to the fourth exemplary embodiment, the timer management part A723 sets t1 and t2, which are the threshold values of the update interval, based on the update frequency of each information to be shared measured by the update frequency measurement part A726. In addition, the transmission determination part A724 sets on each information a threshold value α of the ratio of the new neighboring nodes, which is the criteria of the determination as to whether or not to transmit the information when the neighboring state has changed based on the update frequency of each information measured by the update frequency measurement part A726. Then, when the neighboring state has changed, the transmission determination part A724 includes in the information sharing message only the information for which the ratio of the new neighboring nodes is equal to or greater than α and the time since the last transmission is equal to or longer than t1, and transmits it to the neighboring nodes. In addition, even for cases that do not meet this condition, the transmission determination part A724 includes information for which the time since the last transmission time is equal to or longer than t2 in the information sharing message and transmits it to the neighboring nodes.

Especially, by setting the threshold value of the ratio of new neighboring nodes according to the criteria described in the second exemplary embodiment, and at the same time setting t1 and t2 according to the criteria described in the third exemplary embodiment, the higher the possibility that the node in question has been updated compared to the information transmitted until the last time, the higher the possibility automatically becomes, that the information is transmitted when the neighboring state has changed, on the other hand, the lower the possibility that the node in question has been updated compared to the information transmitted until the last time, the lower the possibility automatically becomes, that the information is transmitted when the neighboring state has changed.

In this manner, the effect of reducing the messages, and the capability of sharing as new as possible information with the neighboring nodes can both be achieved.

Although the present invention has been described in connection with preferred exemplary embodiments and examples, the present invention is not necessarily limited to the exemplary embodiments and examples described above, and various modifications may be made without departing from the technical idea.

What is claimed is:

1. An information sharing method between neighboring nodes, comprising the steps of:
   exchanging a message for information sharing between the neighboring nodes in a lower layer and an upper layer of a network; wherein
   when a state change in said neighboring nodes in said lower layer is detected, each node determines whether or not to transmit said message for information sharing in said upper layer according to contents of the detected state change in said neighboring nodes,
   wherein an upper layer protocol part in each node for exchanging the message for sharing information with the neighboring nodes in the upper layer of the node
   refers to a routing table in a lower layer protocol for exchanging topology information with the neighboring nodes in the lower layer of the network to detect a state change in the neighboring nodes in said lower layer,
   measures frequency at which said information is updated for each of said information, and
   when the state change in the neighboring nodes in said lower layer is detected, determines whether or not to transmit said message for information sharing according to a threshold value of a state change set for each information based on update frequency of said information measured for each information to be shared, and according to a standby time set for each information based on update frequency of said information.

2. The information sharing method between neighboring nodes according to claim 1, wherein
   if, among the number of all the neighboring nodes in said lower layer, the ratio of new neighboring nodes added since said message for information sharing was transmitted the last time is equal to or greater than a preset threshold value,
   said upper layer protocol part determines to transmit said message for information sharing.

3. The information sharing method between neighboring nodes according to claim 1, wherein
   if, among the number of the neighboring nodes in said lower layer, the number of new neighboring nodes added since said message for information sharing was transmitted the last time is equal to or greater than a preset threshold value,
   said upper layer protocol part determines to transmit said message for information sharing.

4. The information sharing method between neighboring nodes according to claim 1, comprising the steps of:
   wherein an upper layer protocol part in each node for exchanging the message for sharing information with the neighboring nodes in the upper layer of the network
   refers to a routing table in a lower layer protocol for exchanging topology information with the neighboring nodes in the lower layer of the network to detect a state change in the neighboring nodes in said lower layer, and
   when the state change in the neighboring nodes in said lower layer is detected, determines whether or not to transmit said message for information sharing for each information according to a threshold value of a state change set for each information based on update frequency of said information measured for each information to be shared.

5. The information sharing method between neighboring nodes according to claim 4, wherein
   if, among the number of all the neighboring nodes in said lower layer, the ratio of new neighboring nodes added since said message for information sharing was transmitted the last time is equal to or greater than a threshold value set based on update frequency for each of said information, the upper layer protocol part determines to transmit said message for information sharing regarding said information corresponding to the threshold value.

6. The information sharing method between neighboring nodes according to claim 4, wherein
if, among the number of the neighboring nodes in said lower layer, the number of new neighboring nodes added since said message for information sharing was transmitted the last time is equal to or greater than a threshold value set based on update frequency for each of said information,
said upper layer protocol part determines to transmit said message for information sharing regarding said information corresponding to the threshold value.

7. The information sharing method between neighboring nodes according to claim 1, comprising the steps of:
wherein an upper layer protocol part in each node for exchanging the message for sharing information with the neighboring nodes in the upper layer of the network refers to a routing table in a lower layer protocol for exchanging topology information with the neighboring nodes in the lower layer of the network to detect a state change in the neighboring nodes in said lower layer, and
when the state change in the neighboring nodes in said lower layer is detected, determines whether or not to transmit said message for information sharing for each information according to a standby time set for each information based on update frequency of said information measured for each information to be shared.

8. The information sharing method between neighboring nodes according to claim 7, wherein
when a change in the neighboring nodes in said lower layer is detected, said upper layer protocol part determines to include in said message for information sharing and transmit said information for which said standby time set for each of said information has elapsed since said message for information sharing was transmitted the last time.

9. The information sharing method between neighboring nodes according to claim 1, comprising the steps of:
wherein an upper layer protocol part in each node for exchanging the message for sharing information with the neighboring nodes in the upper layer of the network refers to a routing table in a lower layer protocol for exchanging topology information with the neighboring nodes in the lower layer of the network to detect a state change in the neighboring nodes in said lower layer, and
when a state change in the neighboring nodes in said lower layer is detected,
determines whether or not to transmit said message for information sharing for each information according to a threshold value of a state change set for each information based on update frequency of said information measured for each information to be shared, and according to a standby time set for each information based on update frequency of said information.

10. A node, which shares information by exchanging a message between neighboring nodes in a lower layer and an upper layer of a network, comprising:
a processor; and
a memory;
wherein said processor executes
a unit which, when a state change in said neighboring nodes in said lower layer is detected, determines whether or not to transmit said message for information sharing in said upper layer according to contents of the detected state change in said neighboring nodes; and
an upper layer protocol part which exchanges a message for sharing information with neighboring nodes in an upper layer of a network,
wherein said upper layer protocol part includes
a neighboring state change detection part which refers to a routing table in a lower layer protocol for exchanging topology information with the neighboring nodes in the lower layer of the network to detect a state change in the neighboring nodes in said lower layer,
an update frequency measurement part which measures a frequency at which said information is updated for each of said information,
a transmission determination part which determines whether or not to transmit said message for information sharing according to a threshold value of a state change set for each information based on updated frequency of said information measured for each information to be shared, and according to a standby time set for each information based on update frequency of said information when said neighboring state change detection part detects the state change in the neighboring nodes in said lower layer.

11. The node according to claim 10, comprising:
an upper layer protocol part which exchanges a message for sharing information with neighboring nodes in an upper layer of a network,
wherein said upper layer protocol part including:
a neighboring state change detection part which refers to a routing table in a lower layer protocol for exchanging topology information with the neighboring nodes in the lower layer of the network to detect a state change in the neighboring nodes in said lower layer; and
a transmission determination part which determines whether or not to transmit said message for information sharing according to contents of the state change in said neighboring nodes when said neighboring state change detection part detects the state change in the neighboring nodes in said lower layer.

12. The node according to claim 11, wherein
said transmission determination part
determines to transmit said message for information sharing if, among the number of all the neighboring nodes in said lower layer, the ratio of new neighboring nodes added since said message for information sharing was transmitted the last time is equal to or greater than a preset threshold value.

13. The node according to claim 11, wherein
said transmission determination part
determines to transmit said message for information sharing if, among the number of the neighboring nodes in said lower layer, the number of new neighboring nodes added since said message for information sharing was transmitted the last time is equal to or greater than a preset threshold value.

14. The node according to claim 10, comprising:
an upper layer protocol part which exchanges a message for sharing information with neighboring nodes in an upper layer of a network,
wherein said upper layer protocol part including:
a neighboring state change detection part which refers to a routing table in a lower layer protocol for exchanging topology information with the neighboring nodes in the lower layer of the network to detect a state change in the neighboring nodes in said lower layer; and
a transmission determination part which determines whether or not to transmit said message for information sharing for each information according to a threshold value of a state change set for each information based on update frequency of said information measured for each information to be shared when said neighboring state change detection part detects the state change in the neighboring nodes in said lower layer.

15. The node according to claim 14, wherein
said transmission determination part
determines to transmit said message for information sharing regarding said information corresponding to a threshold value if, among the number of all the neighboring nodes in said lower layer, the ratio of new neighboring nodes added since said message for information sharing was transmitted the last time is equal to or greater than a threshold value set based on update frequency for each of said information.

16. The node according to claim 14, wherein
said transmission determination part
determines to transmit said message for information sharing regarding said information corresponding to the threshold value if, among the number of the neighboring nodes in said lower layer, the number of new neighboring nodes added since said message for information sharing was transmitted the last time is equal to or greater than a threshold value set based on update frequency for each of said information.

17. The node according to claim 10, comprising:
an upper layer protocol part which exchanges a message for sharing information with neighboring nodes in an upper layer of a network,
wherein said upper layer protocol part includes
a neighboring state change detection part which refers to a routing table in a lower layer protocol for exchanging topology information with the neighboring nodes in the lower layer of the network to detect a state change in the neighboring nodes in said lower layer,
an update frequency measurement part which measures frequency at which said information is updated for each of said information, and
a transmission determination part which determines whether or not to transmit said message for information sharing for each information according to a standby time set for each information based on update frequency of said information measured for each information to be shared when said neighboring state change detection part detects the state change in the neighboring nodes in said lower layer.

18. A non-transitory computer-readable medium storing an information sharing program, wherein said information sharing program causes a node, which is a computer for sharing information by exchanging a message between neighboring nodes in a lower layer and an upper layer of a network, to perform
when a state change in said neighboring nodes in said lower layer is detected, processing of determining whether or not to transmit said message for information sharing in said upper layer according to contents of the detected state change in said neighboring nodes,
wherein said information sharing program causes an upper layer protocol part in said node for exchanging a message for sharing information with neighboring nodes in an upper layer of a network to perform:
neighboring state change detection processing of referring to a routing table in a lower layer protocol for exchanging topology information with the neighboring nodes in the lower layer of the network to detect a state change in the neighboring nodes in said lower layer,
measuring frequency at which said information is updated for each of said information, and
when a state change in the neighboring nodes in said lower layer is detected, transmission determination processing of determining whether or not to transmit said message for information sharing according to a threshold value of a state change set for each information based on update frequency of said information measured for each information to be shared, and according to a standby time set for each information based on update frequency of said information.

* * * * *